Nov. 22, 1955  P. S. BRANDON  2,724,827
FREQUENCY MODULATED RADAR SYSTEMS
Filed Jan. 29, 1951  2 Sheets-Sheet 1

Inventor:
Percy Samuel Brandon;
By his attorneys,
Baldwin & Wight

United States Patent Office 2,724,827
Patented Nov. 22, 1955

2,724,827
FREQUENCY MODULATED RADAR SYSTEMS
Percy Samuel Brandon, Chelmsford, England, assignor to Marconi's Wireless Telegraph Company Limited, London, England, a company of Great Britain
Application January 29, 1951, Serial No. 208,276
Claims priority, application Great Britain February 10, 1950
6 Claims. (Cl. 343—14)

This invention relates to frequency modulated (F. M.) radar systems i. e. to radar systems in which continuously transmitted waves are periodically varied in frequency in accordance with a predetermined law of frequency modulation, received reflected waves (or their derivatives) being mixed with waves then being transmitted (or their derivatives) to produce beat frequencies the values of which are indicative of the distances away (ranges) of the targets reflecting the received waves.

It is, of course, customary in F. M. radar systems as in other radar systems to indicate the position of a target both in azimuth and in range, by means of a single display cathode ray tube, the cathode ray in which is subjected to a linear sweep deflection and is also subjected to an angularly related deflection which moves the position of the line produced by the linear sweep. Thus, for example, in a so-called P. P. I. or sector display, the cathode ray is subjected to a radial deflection which produces a radial line along which range is indicated and is also subjected to a circular deflection which in effect swings said radial line about the center of the screen so that the radial distance of any target indication from the center of the screen gives the range of the target and the direction of said target indication from said center gives the azimuth of the target. P. P. I. and sector displays are the two best known forms of display of the type—herein termed the "translated line" type of display—in which azimuth is shown in terms of the instantaneous position of a line produced by subjecting the ray to a linear sweep and the present invention seeks to remove or reduce certain defects which have hitherto been experienced with F. M. radar systems employing displays of the translated line type.

Figures 1, 4:
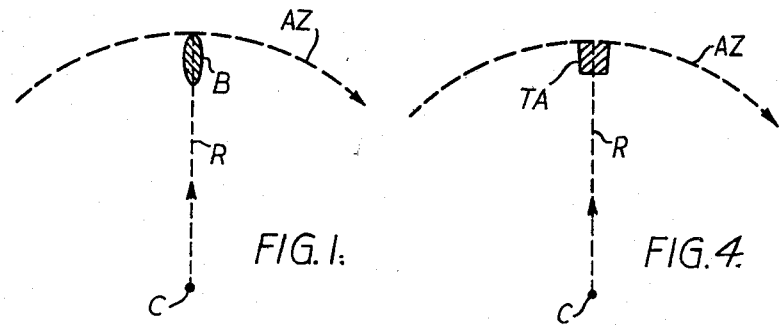
Figure 2:
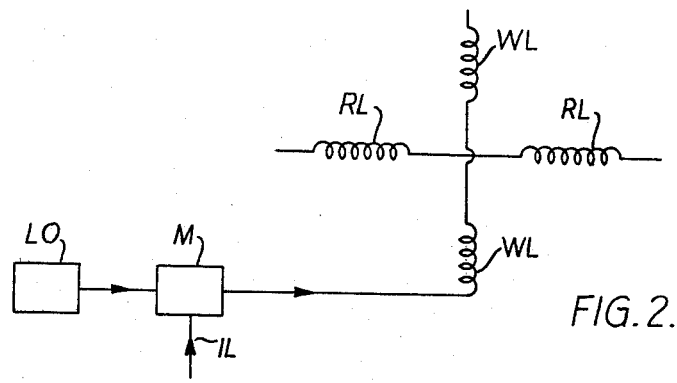
Figure 5:
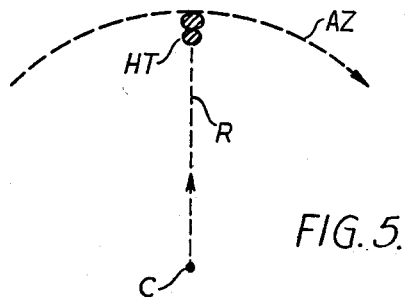
Figure 3:
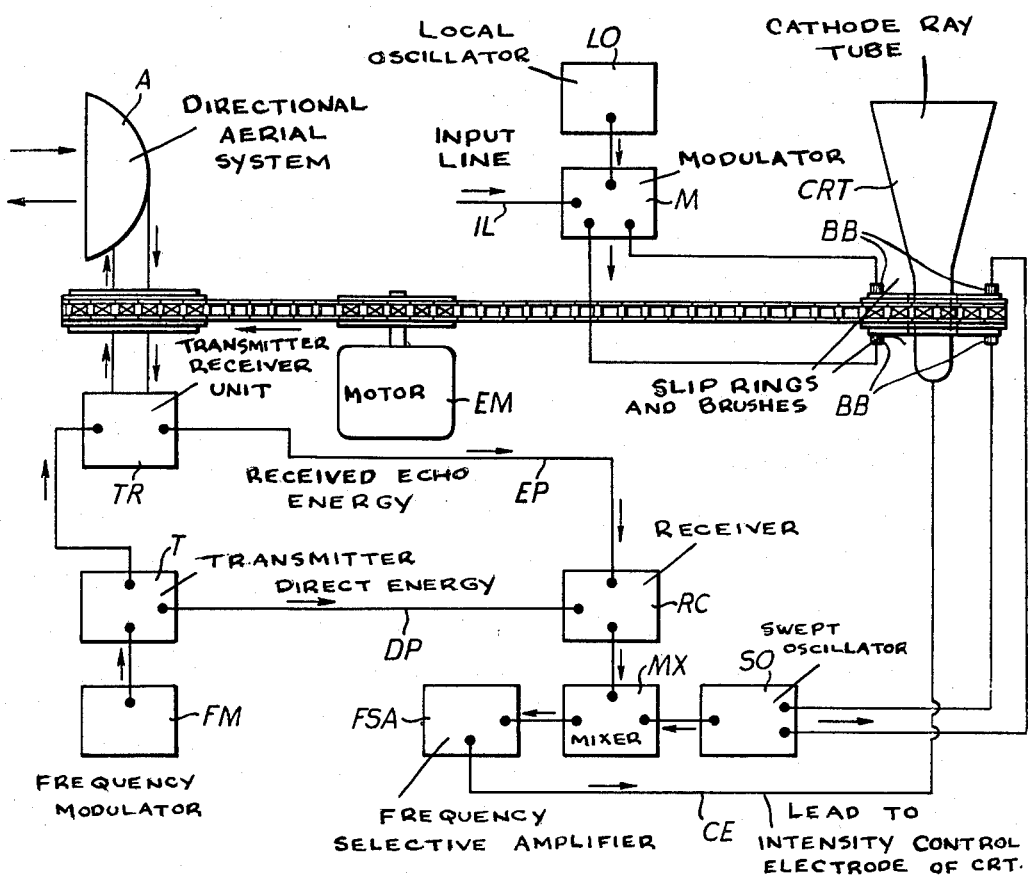

The invention is illustrated in and explained in connection with the accompanying drawings in which Figure 1 is a diagram illustrating a defect encountered with known F. M. radar systems of the translated line display type; Fig. 2 is a block diagram illustrating the present invention; Fig. 3 is a schematic view showing the application of the system of my invention to a frequency modulated radar system and showing particularly the received echo energy paths and the direct energy paths in the transmission-receiving circuits; and Figs. 4 and 5 are diagrams of the same nature as Fig. 1 illustrating results obtained with the present invention.

In order to decrease the time taken to "paint" a P. P. I., sector or other display of the translated line type, it is often necessary in F. M. radar systems to reduce the number of linear sweeps per unit of angular or other translational deflection below what would otherwise be regarded as satisfactory if a slowly painted picture could be accepted. Indeed, slowness of paint is one of the apparently inherent difficulties with most known F. M. radar systems. The result of reducing the painting time by reducing the number of linear sweeps per unit of translational deflection—e. g. with a P. P. I. display by reducing the number of radial sweeps per unit of azimuthal deflection—is often to spoil the continuity of the picture painted and in the case of a P. P. I. or sector display, to cause the picture to present an appearance like the spokes of a wheel. This "spokiness" is annoying and a nuisance to the operator.

Another difficulty in F. M. radar systems is that of obtaining sufficient power and because of this it is often sought to increase aerial gain by narrowing the width of the radio beam in the horizontal plane. This commonly leads to the result that the resolution in azimuth and the radial (range) resolution do not match, the former usually being much the better. This in turn involves elongation of the target indications given in a display of the type referred to. Thus, with a P. P. I. or sector display, if azimuthal resolution is much better than radial (range) resolution, what should be a target "spot," is elongated in the radial deflection becoming more or less an ellipse. This is illustrated in Fig. 1 in which the point C is the point (usually the center) on the screen of the display tube corresponding to the position of the radar system and B typifies the sort of distorted elongated target representation which is obtained, the broken line AZ representing the translating deflection direction (azimuth) and the broken line R representing the linear deflection direction (range). Such distortion besides being objectionable in itself, may involve that two targets of virtually the same azimuth and of ranges which do not much differ, may appear merely as one radially elongated mark.

The present invention seeks to avoid or reduce the above mentioned defects in F. M. radar systems employing displays of the translated line type and this object is achieved, according to the said invention, by subjecting the ray in the display tube to an additional "wobbling" transverse deflection at right angles or approximately at right angles to the direction of linear deflection. As will be appreciated, the wobbling deflection provided by this invention in effect widens the line traced by the linear deflection.

Where the invention is applied to a system in which the linear deflection produces a radial line which is circularly deflected in accordance with azimuth the wobble is preferably either such as to produce in effect a constant angular spreading of the line or such as to produce in effect a spread the angular amount of which is dependent on the instantaneous received signal strength at the relevant part of the radial sweep. In the former case the wobble amplitude will be made linearly proportional to the distance of the spot from the center of the tube; in the latter case the wobble amplitude will be made proportional to received signal level.

The invention is applicable alike to systems with tubes employing electro-static or electro-magnetic methods of deflection but a preferred embodiment with an electro-magnetically deflected C. R. tube will now be described with reference to Figs. 2 and 3 in the former of which only those parts are shown which are necessary to an understanding of the present invention, while the latter is a block and schematic diagram showing the system as a whole.

Referring to Figs. 2 and 3 the radar system of the embodiment shown therein is of generally known type comprising the usual directional aerial system A which is swung round in azimuth, the usual transmitter T transmitting a continuous wave which is frequency modulated in accordance with a saw tooth law by a frequency modulation FM, and the usual receiver RC at some stage in which received echo energy and energy direct from the transmitter are produced to produce beat notes. The received echo energy follows the path EP and the direct energy the path DP, the system chosen for illustration being of the well known type in which, as shown in Fig. 3, the same aerial is used both for transmission and reception; there being the usual known suitable transmitter-receiver unit TR to allow this to be done. The resultant beat notes are fed to a mixer MX to which are also fed local oscillations from an oscillator SO which is cyclically varied in frequency in accordance with a saw tooth wave form (so-called "swept oscillator") and the resultant mixer output is passed to a fixed frequency selective amplifier FSA of predetermined band-pass width the output of which is passed over lead CE to the intensity control electrode of a cathode ray tube CRT. The ray in the tube is subjected to a radial deflection produced by coils RL (shown separately in Fig. 2 and incorporated in the rotary coil unit carrying the legend RL, WL in Fig. 3) and synchronized with the swept oscillator SO so that, at any distance, the distance of the spot in the tube from the center of the screen is proportional to the range of a target which is able to produce echoes which will result in signals which will pass the selective amplifier at that time. This deflection is produced electro-magnetically by what may be termed radial deflecting coils RL. The ray is also subjected to electro-magnetic circular deflection synchronized with the azimuth swing of the aerial system and produced in any known way, for example, mechanically as illustrated schematically in Fig. 3 where the motor EM rotates the aerial A and also the coil unit RL, WL, said unit rotating about the axis of the tube CRT, the coils thereon being fed through slip rings and brushes, the latter being conventionaly represented at BB. As so far described the system is that of a well known F. M. radar system with a so-called spectrum analyzing receiver and a P. P. I. display and, because the system is so well known, the various parts referred to are not shown in Fig. 2 except for the linear deflecting coils RL. In accordance with this invention the ray in the tube is also subjected to an additional wobbling deflection the term is herein used to mean an oscillation deflection back and forth in a direction at right angles to the radial direction and produced by coils WL at right angles to the radial deflecting coils RL and incorporated in the unit RL, WL of Fig. 3. These coils WL, hereinafter termed the "wobble coils" are fed with alternating current which ideally should be of isoceles triangular wave form but may most conveniently be of approximately sinusoidal form derived from a local oscillator LO of suitably high frequency. The output from this local oscillator LO, before being passed to the wobble coils WL, is preferably modulated by a modulator M in output in either of two ways either (1) so that its amplitude is proportional to the instantaneous distance of the spot from the center of the screen or (2) so that its amplitude is proportional to the instantaneous received signal level. In the former case the modulating input to the modulator M fed in over the input line IL will be (in the system in question) a saw-tooth wave which can most conveniently be derived from the swept oscillator; in the latter case said modulating input will be a control wave derived by rectifying received signals at any convenient stage of the receiver. In the former case the result on the screen of the tube will be as exemplified in Fig. 4 i. e. to "spread" a target indication into approximately a part of an annulus as shown at TA, said part always subtending the same angle at the center of the screen. In the latter case the result on the screen will be to build up into a spot of approximately circular shape with the true target indication at its center. It will be seen that, in the latter case, two adjacent targets of the same or approximately the same azimuth will combine to produce a sort of hour-glass shaped indication such as is exemplified at HT in Fig. 5 and which will, by its shape, indicate the presence of two targets.

As will be apparent to those skilled in the art the means for producing wobbling deflection (as illustrated, the coils WL) may also serve other purposes e. g. the coils WL might be part of a known fixed crossed coil system with mutually perpendicular coils fed in quadrature with equal amplitudes to give azimuth deflection in the known way. In such a case, to apply the present invention, the wobble producing wave might be superimposed on the input to the appropriate one of the two mutually perpendicular pairs of coils.

I claim:

1. A frequency modulated radar system comprising means for transmitting a frequency modulated continuous wave, means for receiving said wave after reflection by a target, means for mixing received reflected wave energy with wave energy then being transmitted to produce beat note energy indicative of the range of the reflecting target, a display arrangement of the translated line type, said arrangement including a cathode ray tube, means for deflecting the cathode ray therein radially, means controlled by said beat energy for controlling the intensity of said ray to produce a target indication in said tube and means for subjecting said ray to circular deflection to translate the line produced by the radial deflection, a source of addition high frequency ray deflecting force, and means for applying said force to deflect said ray additionally with a high frequency oscillating deflection angularly disposed with respect to the radial deflection for producing a wobbling display.

2. A frequency modulated radar system as set forth in claim 1 wherein the high frequency oscillating deflection is at right angles to the direction of radial deflection.

3. A frequency modulated radar system as set forth in claim 1 wherein the azimuth of said system is variable and wherein the means for subjecting the ray to circular deflection operates in synchronism with the azimuth variation, the additional high frequency oscillating deflection being of an amplitude substantially proportional to the instantaneous value of the radial deflection to produce a substantially constant angular spreading of the radial line.

4. A frequency modulated radar system as set forth in claim 1 wherein the azimuth of said system is variable and wherein the means for subjecting the ray to circular deflection operates in synchronism with the azimuth variation, the additional high frequency oscillating deflection being of an amplitude substantially proportional to the instantaneous value of the radial deflection to produce a substantially constant angular spreading of the radial line and being in a direction at right angles to the direction of radial deflection.

5. A frequency modulated radar system as set forth in claim 1 wherein the azimuth of said system is variable and the means for subjecting the ray to circular deflection operates in synchronism with the azimuth variation, the additional high frequency oscillating deflection being of an amplitude substantially proportional both to the instantaneous value of the radial deflection and to the concurrent received signal strength to produce a spreading of said line substantially proportional to the instantaneous received signal strength at the relevant part of the radial line.

6. A frequency modulated radar system as set forth in claim 1 wherein the azimuth of said system is variable and wherein the means for subjecting the ray to circular deflection operates in synchronism with the azimuth variation, the additional high frequency oscillating deflection being of an amplitude substantially proportional both to the instantaneous value of the radial deflection and to the concurrent received signal strength to produce a spreading of said line substantially proportional to the instantaneous received signal strength at the relevant part of the radial line and being in a direction at right angles to the direction of radial deflection.

References Cited in the file of this patent

UNITED STATES PATENTS

| | | |
|---|---|---|
| 2,416,591 | Muntz | Feb. 25, 1947 |
| 2,427,905 | Fyler | Sept. 23, 1947 |
| 2,432,330 | Norgaard | Dec. 9, 1947 |
| 2,468,032 | Busignies | Apr. 26, 1949 |
| 2,520,595 | Fernsler | Aug. 29, 1950 |
| 2,536,770 | Rost | Jan. 2, 1951 |
| 2,590,114 | McVay | Mar. 25, 1952 |
| 2,617,982 | Holschuh | Nov. 11, 1952 |